April 14, 1970  J. E. McKEE ET AL  3,505,759
DIE-CUT FOLDABLE STRUCTURAL UNITS
Filed Sept. 2, 1965  3 Sheets-Sheet 1
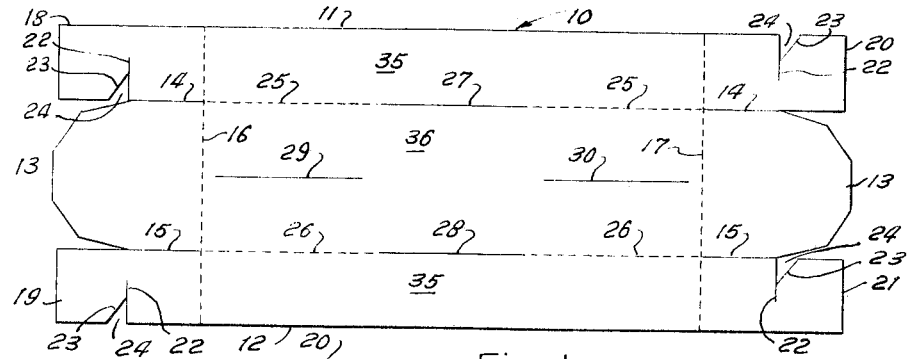
Fig. 1
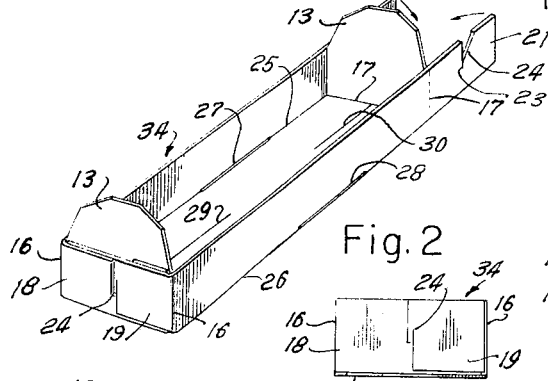
Fig. 2
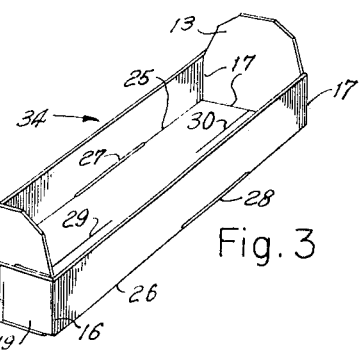
Fig. 3
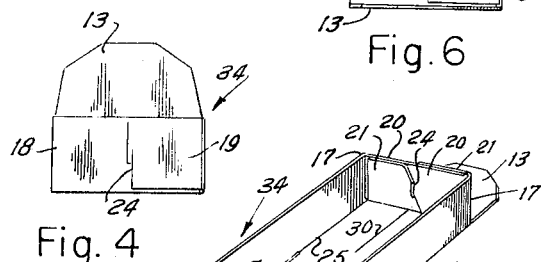
Fig. 5
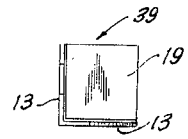
Fig. 6
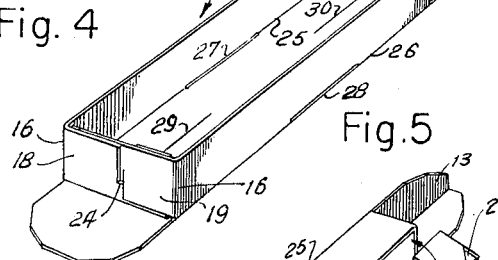
Fig. 4
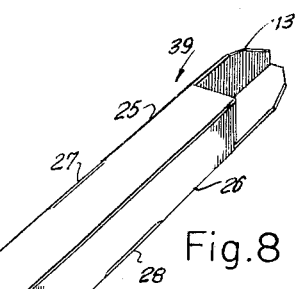
Fig. 8-A
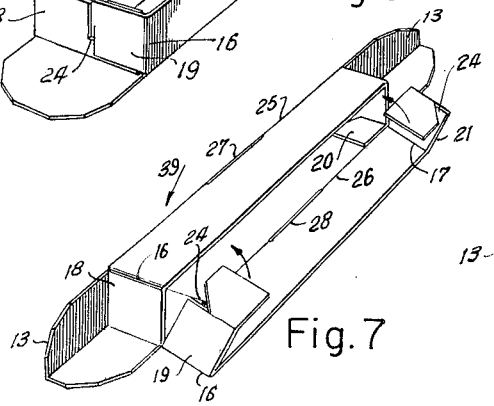
Fig. 7  Fig. 8
INVENTORS
James E. McKee
Donald R. McKee
Charles F. McKee
BY  Cecil L. Poda
ATTORNEY INVENTORS
James E. McKee
Donald R. McKee
Charles F. McKee BY Cecil L. Wood
ATTORNEY

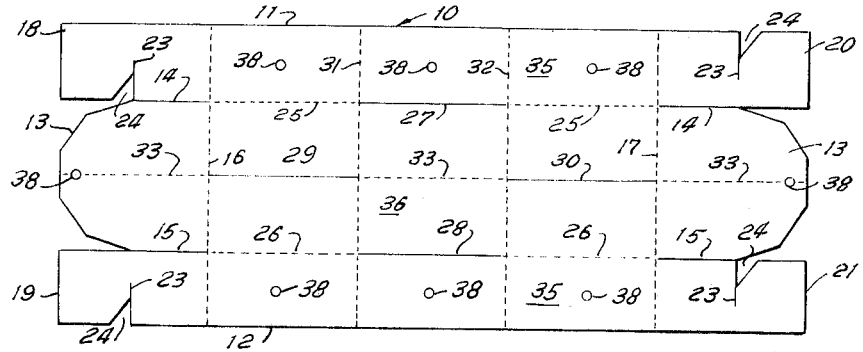
Fig.13
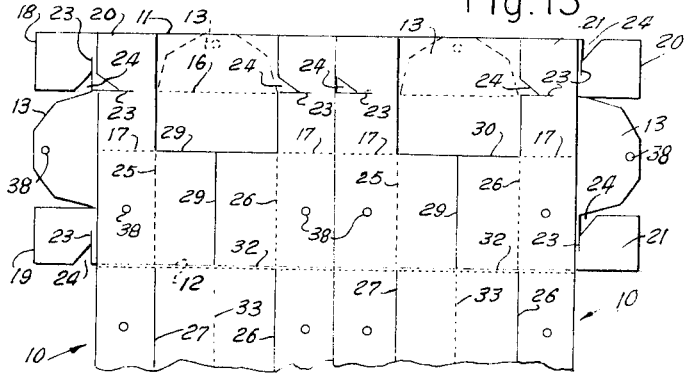
Fig.14
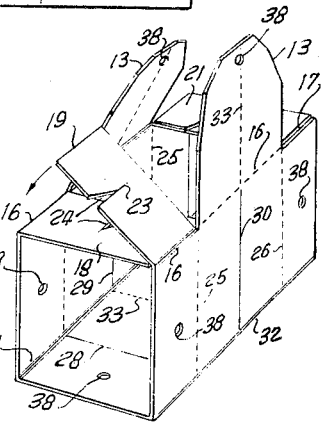
Fig.15
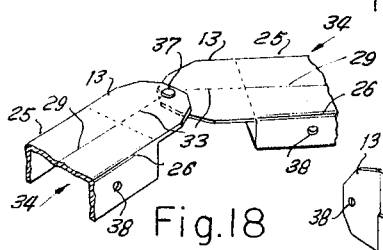
Fig.18
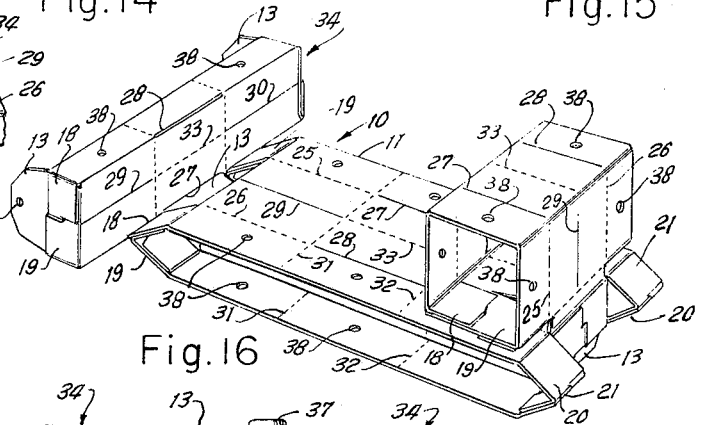
Fig.16
Fig.17
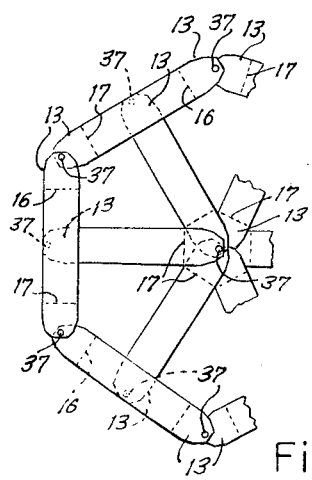
Fig.19
INVENTORS
James E. McKee
Donald R. McKee
Charles F. McKee
BY
ATTORNEY

United States Patent Office 3,505,759
Patented Apr. 14, 1970

3,505,759
DIE-CUT FOLDABLE STRUCTURAL UNITS
James E. McKee, Donald R. McKee, and Charles F. McKee, all of 3119 Milton, Dallas, Tex. 75205
Filed Sept. 2, 1965, Ser. No. 484,587
Int. Cl. A63h *33/08;* B65d *5/26*
U.S. Cl. 46—23                         1 Claim

ABSTRACT OF THE DISCLOSURE

The invention concerns the provision of a flexible structural unit which is die-cut in blanks from cardboard or paper, and generally rectangular in outline, having a plurality of tabs and strategically located slits and scorings by which the blank can be folded and the tabs interlocked or lapped to produce units having a variety of forms, and whereby certain of the tabs can be selectively extended through the slits in the blanks to join the several formed units in a composite structure.

---

This invention relates to toys and it has particular reference to flexible strips die-cut from cardboard, or other materials having similar characteristics, capable of being folded in various ways to assume different structural shapes and detachably associated to produce a variety of fanciful structures such as fabricated buildings, vehicles, and the like.

Numerous devices have been provided in the form of die-cut blanks having various shapes in outline, and having scorings and slots therein, and interlocking tabs by which the blanks can be folded and shaped into cartons and containers for merchandise but capable of being converted into different shapes to produce toys, including articles of simulated household furniture, vehicles, and numerous other articles. Such conventional devices, however, are generally limited in their adaptations to use as toys due to the necessity for forming the blanks in such manner as to effect their primary function as a container.

A primary object of the invention is that of providing a single blank which is die-cut from sheets of relatively stiff but flexible material, such as a good quality cardboard or paper, and generally rectangular in outline, having a plurality of tabs and strategically located slits and scorings by which the blank can be folded and the tabs interlocked or lapped to produce units having a variety of forms, and whereby certain of the tabs can be selectively extended through the slits in the blanks to join the several formed units to produce a composite structure.

Another object of the invention is that of providing a unique device in the form of substantially rectangular sheets, as described, and which are uniform in shape and dimensions, capable of being compactly packaged in laminated stacks in such numbers as desired with suitable instructions for use.

Yet another object of the invention is that of providing a flexible structural unit which can be formed in various ways by architects, structural engineers, and the like, or students in such fields, and utilized as component mock-up structures in experimental and planning activities, and through the medium of which the feasibility of certain factors in different types of construction can be predetermined.

Broadly, the invention contemplates the provision of a simple, inexpensive and versatile device by which both children and adults can fabricate a variety of structures, and afford a practical means for both entertainment and education, especially for children, and a device which can be advantageously employed in the field of therapy for the mentally retarded or the physically handicapped.

While the foregoing objects are paramount, other and lesser objects will become apparent as the description proceeds when considered in connection with the appended drawings wherein:

FIGURE 1 is a plan view of a die-cut unit embodying the invention and formed of a flexible but durable paper stock.

FIGURE 2 is a perspective illustration of a typical structure partially formed from the unit.

FIGURE 3 is another perspective illustration of the completed structure shown in FIGURE 2.

FIGURE 4 is an end elevational view of the structure shown in FIGURES 2 and 3.

FIGURE 5 is still another perspective illustration of a structure formed from the die-cut unit embodying the invention.

FIGURE 6 is an end elevational view of the structure shown in FIGURE 5.

FIGURE 7 is a perspective illustration showing the invention in the process of being formed into another structural element.

FIGURE 8 is a perspective illustration of the structure shown partially completed in FIGURE 7.

FIGURE 8–A is an end elevational view of the structure shown in perspective in FIGURE 8.

Figure 9:
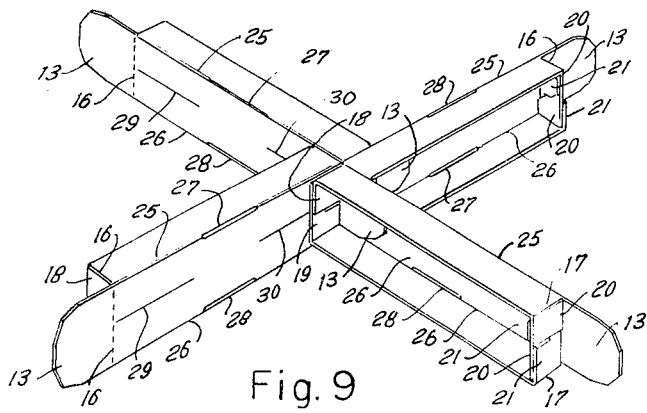

FIGURE 9 is a perspective view of a structure comprised of a plurality of the unit embodying the invention, and illustrating the various applications of the tabs and slits formed with the unit.

Figure 10:
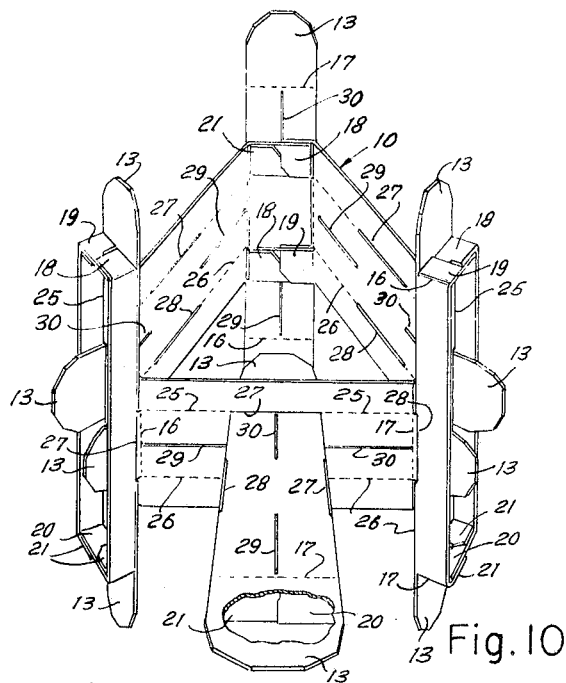

FIGURE 10 is a perspective illustration of a more complex structure in which several of the units are associated through the arrangement of tabs, slits and scorings in the unit.

Figure 11:
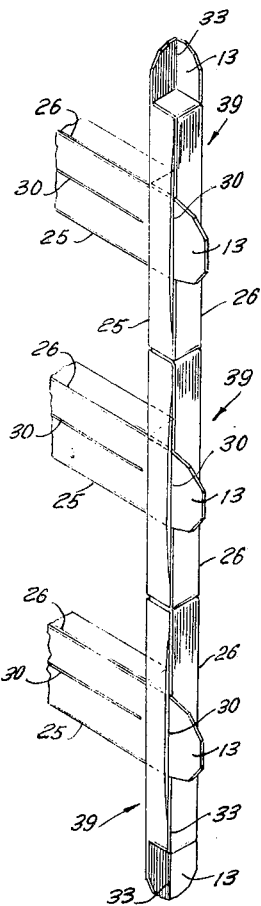

FIGURE 11 is a fragmentary perspective illustration of a structure in which a plurality of the forms of structures shown in FIGURES 8 and 9 are employed.

Figure 12:
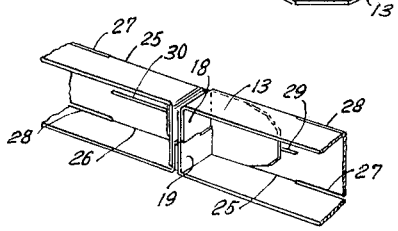

FIGURE 12 fragmentarily illustrates, in perspective, a pair of the structures shown in 5 axially joined and interlocked.

FIGURE 13 is a plan view of a modified form of the die-cut unit embodying the invention.

FIGURE 14 is a plan view showing the interlocking association of a plurality of the unit shown in FIGURE 13, in transverse arrangement, the uppermost unit being fragmentarily shown.

FIGURE 15 is a perspective illustration of a typical box-like structure, partially formed, in which the modified embodiment of the invention is employed.

FIGURE 16 is a perspective view of still another structure fabricated with the invention.

FIGURE 17 is a fragmentary elevational view, partially in section, showing a pair of the units pivotally joined with a fastener arranged through tabs formed on the unit.

FIGURE 18 is a fragmentary perspective illustration of the arrangement shown in FIGURE 17, and FIGURE 19 is a fragmentary plan view of a wheel structure formed by joining a plurality of the structures shown in FIGURES 17 and 18.

The invention, in its broadest concept, may assume a variety of forms as to its peripheral outline although, by reason of its intended applications, it should be generally rectangular. In its simplest form the element embodying the invention comprises a unitary strip or sheet 10 of greater length than width, as shown best in FIGURE 1, having parallel side edges 11 and 12 and cut-out tongues 13 formed on each end whose lateral dimensions approximate one-half of the transverse dimension of the unit 10 and are defined along each side by parallel cuts 14 and 15 which extend inwardly and longitudinally of the unit 10, from each end thereof, terminating at scored lines 16 and 17 formed transversely of the unit 10 and are represented by broken lines in FIGURE 1. The outline of each of the tongues 13 may be generally semicircular or formed with angular segments, as desired.

Adjacent each edge of the tongues 13, and along the cuts 14 and 15, are tabs 18, 19, 20 and 21, which are coextensive with the tongues 13 and are straight across their outer ends, their inner ends being defined by the scored lines 16 and 17 which traverse the unit 10. Each of the tabs 18, 19, 20 and 21 have cuts 22 transversely thereof, extending from one side and extending across the greater dimension thereof, or beyond their medial axes, and each tab is cut back at 23 at an approximate 45-degree angle to intersect the cuts 22 intermediate their ends defining substantially V-shaped notches 24, as shown in FIGURE 1.

It is pointed out, by reference to FIGURE 1, that each pair of the tabs 18, 19, 20 and 21 have their notches 24 extending inwardly in the same direction, but in opposite arrangement at each end of the unit 10, the purpose of which will become apparent as the description proceeds.

Coextensive with each of the parallel cuts 14 and 15, and longitudinally of the unit 10 are scored fold lines 25 and 26, each having a slit 27 and 28 formed therealong approximating in length one-third of that of the lines 25 and 26 and intermediate the transverse scored lines 16 and 17. Along the medial axis of the unit 10, and spaced inwardly from each of the scored lines 16 and 17, are elongated slits 29 and 30 which are offset longitudinally with respect to the slits 27 and 28 but in a plane parallel thereto, all as shown in FIGURE 1.

In FIGURE 13 is illustrated a modified form of the unit 10 which is identical in outline, having a the tongues 13, the similarly formed tabs 18, 19, 20 and 21, the transverse scored fold lines 16 and 17, the longitudinal scored fold lines 25 and 26, and the slits 27, 28, 29 and 30. In addition, however, the modified unit is provided with transverse scored fold lines 31 and 32, which intersect the scored lines 25 and 26 at the ends of the slits 27, 28, 29 and 30, and a longitudinal scored fold line 33 is formed intermediate the edges 11 and 12 of the unit 10 along the slits 29 and 30 therein, the line 33 being coextensive with the unit 10 and its tongues 13. By this arrangement a plurality of rectangular panels of equal dimensions are defined whose function will presently be described.

While a number of different structures are shown formed with the device embodying the invention, it is obvious that when folded along selected scorings provided in the unit, and the tongues 13 and the respective tabs are interlocked at the ends, innumerable structures can be formed. The arrangement and positioning of the cuts 14 and 15, the slits 27, 28, 29 and 30, and the various scored lines afford almost unlimited possible structural combinations.

One of the simplest unitary structural elements, generally designated by the numeral 34, is that shown in FIGURES 2, 3, 4, 5 and 6, in which the several steps by which the elements are formed are illustrated. This form is accomplished by folding the marginal panels 35 on each side of the unit 10 along the longitudinal scored lines 25 and 26 so that these panels are perpendicular to the central panel 36, as provided by the unit shown in FIGURE 1, or the composite panel 37 of the modified unit shown in FIGURE 13, and the end tabs 18, 19, 20 and 21, or either pair thereof are folded along the lines 16 or 17, and interlocked in the manner shown in FIGURES 2, 3, 4, 5 and 6, an elongated box structure will result, such as shown particularly in FIGURE 3, when the tongues 13 are also folded along the scored lines 16 and 17 and retained by the interlocked tabs.

The structural element 34 is probably the most versatile as a component in the variety of structures capable of being produced by combining a number of the units 10 since this element can be more readily embodied into a greater variety of designs, such as those shown in FIGURES 9, 10, 11, 12, 18 and 19. In most instances it is desirable to leave one or both of the tongues 13 of the element 34 extended to be selectively inserted through one of the slits 27, 28, 29 or 30, in the manner shown in FIGURES 10 and 11, or inserted behind the interlocked tabs of one end of the element 34, as best illustrated in FIGURE 9, where the elements 34 can be joined in right-angular arrangement, or radially as desired.

Since the peripheral outline of the unit 10 is not changed in the modification, shown in FIGURE 13, all of the conceivable shapes of structural designs of the type indicated can be accomplished with either form. In shaping the unit 10 into tubular form, such as shown in FIGURES 7, 8, 9 and 11, it is desirable to employ the form shown in FIGURE 13 which has the medial scored line 33 extending along the tongues 13 so that when the side panels 35 are folded at right angles along the scored lines 25 and 26 an additional fold along the line 33 will produce the result shown in FIGURES 7 and 8.

In this operation, which is demonstrated in FIGURE 7, the outer portions of the tabs are folded along the cuts 22 by which the end portions of the tabs are enclosed in the structure instead of being interlocked in the manner shown in FIGURES 2 through 6. In the tubular structure the tongues 13, being creased along the intermediate scored line 33, assume a right-angular shape, as best illustrated in FIGURES 7, 8 and 9, or in the structure shown in FIGURE 11.

It is contemplated that in some structural designs it is desirable to provide fastening devices 37 which can be inserted through apertures 38 formed in the side panels 35 and the tongues 13, as shown in FIGURES 13 through 19. The application of the fasteners 37, which are preferably of a plastic material, is shown in FIGURES 17, 18 and 19. The tubular structure, shown in FIGURES 7, 8, 8–A and 11, is generally designated by the numeral 39.

While extremely simple in design, the invention is uniquely capable of embodiment into innumerable structural forms, and although it has been specifically shown and described certain changes and modifications therein may be resorted to, by persons skilled in the art, without departing from the spirit and intent thereof or the scope of the appended claims.

What is claimed is:

1. In a die-cut cardboard blank for forming, when folded, a box-like unit joinable with other like units in a variety of arrangements in a composite structure, the combination with a narrow elongated rectangular panel in said blank defined by a pair of scored lines formed longitudinally of said blank and spaced apart and from each of the opposing marginal edges thereof, and scored lines transversely of said blank and spaced from each end thereof and intersecting each of the longitudinal lines, the said blank being cut along each of the longitudinal lines from each transverse line to the ends of said blank forming end flaps continuous with said panel, and a side flap adjacent to and coextensive with each side of each of said end flaps, each having a mutual engaging slit and an indentation formed in marginal portions thereof for interlocking connection between each pair of said side flaps to form, with said panel, a box-like structure when said blank is folded along each of the scored lines, the said blank having first slit means formed along each longitudinally scored line intermediate its ends, and having second slit means along the longitudinal medial line of said panel and offset relative to said first slit means, said first and second slit means being adapted to receive the end flaps of another like unit whereby two or more units can be removably connected to each other.

References Cited

UNITED STATES PATENTS

| | | | |
|---|---|---|---|
| 1,335,701 | 3/1920 | Ramsburg | 229—35 |
| 1,955,663 | 4/1934 | Wendell. | |
| 2,061,510 | 11/1936 | Drumpelmann | 46—21 XR |
| 2,075,259 | 3/1937 | Battjes | 46—21 XR |
| 2,318,711 | 5/1943 | Phelan | 229—35 XR |
| 2,443,256 | 6/1948 | Lebold | 229—35 XR |
| 2,934,252 | 4/1960 | Wickstrom | 229—35 |
| 3,093,291 | 6/1963 | Brandle | 229—35 |
| 3,368,316 | 2/1968 | Crowder | 46—19 XR |

ROBERT PESHOCK, Primary Examiner

U.S. Cl. X.R.

229—35